FIG. I

INVENTOR.
Harrell L. Bilhartz
Henry F. Dunlap

Oct. 7, 1952     H. L. BILHARTZ ET AL     2,613,250

METHOD FOR MEASURING RESISTIVITY OF EARTH SAMPLES

Filed Oct. 6, 1950     2 SHEETS—SHEET 2

ATTEST
Clarence R. Patty, Jr.

INVENTOR.
Harrell L. Bilhartz
Henry F. Dunlap
BY Norbert E. Burch
Attorney

Patented Oct. 7, 1952

2,613,250

UNITED STATES PATENT OFFICE 2,613,250

METHOD FOR MEASURING RESISTIVITY OF EARTH SAMPLES

Harrell L. Bilhartz and Henry F. Dunlap, Dallas, Tex., assignors to The Atlantic Refining Company, Philadelphia, Pa., a corporation of Pennsylvania Application October 6, 1950, Serial No. 188,768

7 Claims. (Cl. 175—183)

This invention relates to a method of determining the variation of resistivity of earth samples with the percent saturation of said samples by a current conducting fluid. More particularly it relates to method and apparatus whereby variations in the electrical resistance of a core sample taken from a formation of suspected oil bearing characteristics may be measured as the saturation of said sample with brine is varied.

In the process of making electrical logs of wells the resistance to flow of electric current through the various formations through which the well passes is measured. When this measurement is compared with the resistance to flow of electric current through a sample of the same formation at 100% saturation, certain calculations may be made whereby the percent saturation of said formation may be determined. If this saturation proves to be less than 100% there is a possibility that the undersaturation is due to the presence of hydrocarbon deposits in the formation. As is well known in the art, the relationship between the resistivity of a formation sample in its native state ($R_s$), its resistivity at 100% saturation ($R_{100}$), and its percent saturation in its native state (S) may be expressed by the formula $R_s = R_{100} S^{-n}$, where $n$ is the saturation exponent, dependent for its value upon the saturation-resistivity characteristics of the formation sample.

Until recently it was thought that the exponent $n$ in the above formula had a value of 2 irrespective of the nature of the formation being tested. Recent experiments, however, have shown that this exponent may vary from about unity to a value of 2½ or even higher. Since the saturation exponent $n$ is a variable it is extremely important that its value be accurately determined with respect to the particular formation undergoing test in order to arrive at any accurate conclusions as to the percent saturation of the formation.

It is an object of this invention therefore to provide method and apparatus whereby the change in resistivity of a core sample may be determined as a function of the percent saturation of said core sample, in order that the value of the saturation exponent $n$ corresponding to said core sample may be accurately determined.

It is a further object of this invention to provide method and apparatus whereby the core sample being tested may have its percent saturation reduced to a selected value by the capillary pressure method, below described, of displacing the saturating fluid, may be maintained under static conditions until a state of equilibrium is reached, and its resistance measured while it is held under such static conditions to maintain said state of equilibrium.

It is a further object of this invention to provide a method of determining the average resistivity of a core sample as a function of its saturation which comprises measuring the variation of resistivity of a plurality of increments of said core with variations in saturation of said core sample.

Further objects and advantages of this invention will become apparent from the following description taken in connection with the attached drawings.

In the drawings, Figure 1 represents a fluid-tight cell in which a core sample is placed for test in accordance with the method of this invention.

may be determined.

Briefly stated this invention deals with method and apparatus for measuring the electrical resistance of a core sample at 100% saturation with a selected brine solution, reducing the saturation of said core sample under controlled conditions, permitting the core to reach a state of equilibrium at reduced saturation, and thereafter again measuring the resistivity of the core sample while maintaining the sample in its condition of equilibrated reduced saturation. The resistance of the sample may then be plotted against percent saturation on log-log paper, and the value of the exponent $n$ determined by measuring the slope of the resulting curve.

Figure 1:
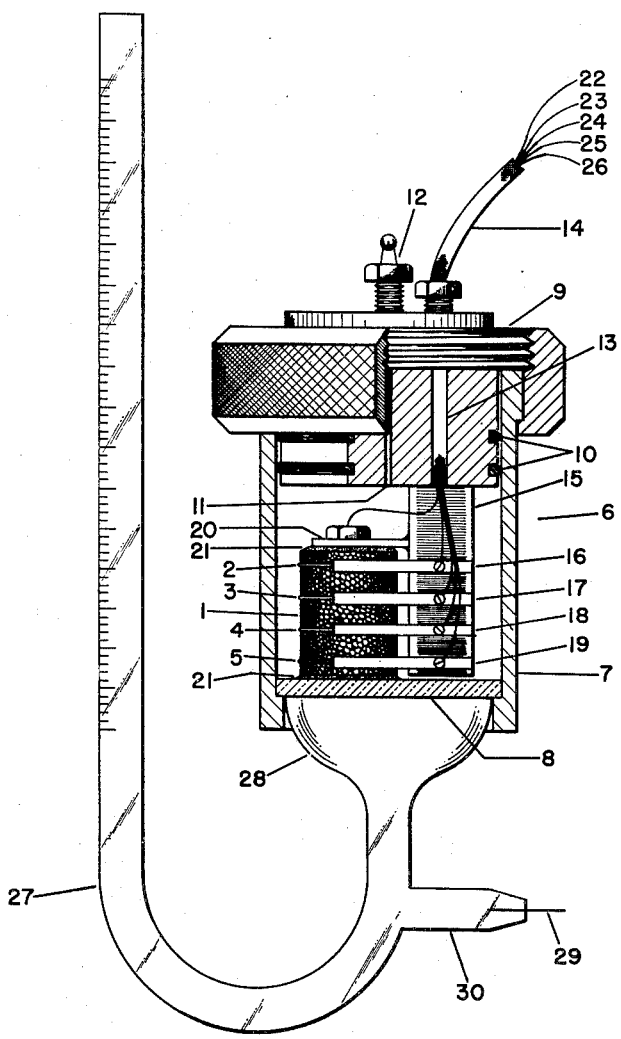

The apparatus utilized in connection with practicing the method of this invention is shown in Figure 1. The core 1, having wires 2, 3, 4, and 5 of an electrically conducting material fastened tightly about the circumference thereof, is shown in place in an enclosing cell generally designated by the numeral 6. Cell 6 comprises a hollow cylinder 7, preferably of metal, which constitutes the sidewalls thereof, and a ceramic disc 8 which is mounted, with a fluid-tight seal, within said cylinder a short distance above the lower edge thereof. Disc 8 is permeable to brine but impermeable to a brine-displacing fluid which is introduced into said cell in accordance with the method of this invention as explained more fully hereinafter. The cell 6 is adapted to be closed at the top by means of a top 9 which may be secured to cylinder 7 by any suitable means, such as threaded engagement. Annular rings 10 made of rubber or any other suitable material are provided to insure a sealed connection between the cap 9 and the interior surface of sidewall 7. A duct 11 passing through cap 9 provides for communication between the interior and exterior of cell 6 when cap 9 is in place. Nipple 12 is secured to the top of cap 9 at the outer end of duct 11 to provide a means of attachment to a source of brine-displacing fluid, not shown, for introduction of said fluid into cell 6 through duct 11. Another duct 13 also passing through cap 9 is provided for the purpose of accommodating electrical cable 14. Packing means, not shown, is used to insure a sealed connection between duct 13 and cable 14 so that fluid under pressure in cell 6 will not escape through said duct. Terminal board 15 of a non-conducting material is attached by any suitable means, such as brackets, not shown, to the lower side of cap 9 and in close proximity to the inner end of duct 13. Terminal board 15 carries contactor strips 16, 17, 18, and 19, which are adapted to contact wires 2, 3, 4, and 5 respectively. A current electrode 20 is adapted to be placed atop core 1, and good electrical contact between said electrode and said core as well as between said core and ceramic disc 8 is insured by the presence of thin layers 21 of moistened diatomaceous earth or other suitable material, such as a graphite-diatomaceous earth mixture. Electrical conducting wires 22, 23, 24, 25, and 26, the lower ends of which are connected respectively to electrode 20 and contactors 16, 17, 18, and 19 respectively, are contained within cable 14, whereby their free ends are brought outside cell 6.

A U-tube 27, made of glass or some similar non-conducting material, has one of its ends 28, which is enlarged as shown in Figure 1, sealed within the lower end of cylinder 7 below the ceramic disc 8 so that any brine passing through ceramic disc 8 will flow into said U-tube. An electrode 29 passes through projection 30 on U-tube 27 for a purpose to be more fully explained hereinafter. The other end of U-tube 27 is open to the atmosphere and is provided with graduations whereby the height of fluids standing therein may be readily determined.

Figure 2:
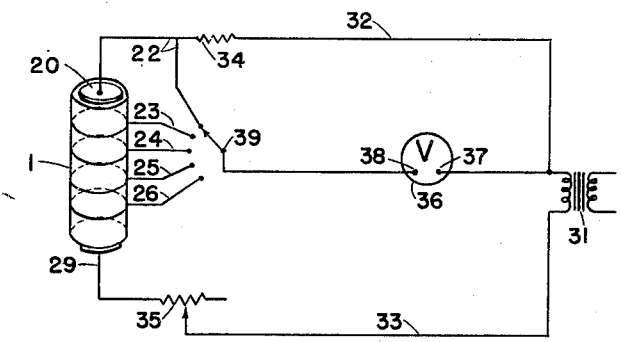
Figure 2 is a circuit diagram showing an electrical circuit which may be used in measuring the electrical resistance of a core sample according to the method of this invention.

Figure 2 is a schematic drawing of the electrical circuit whereby current is caused to pass through the core 1 and the resistivity of the core to the flow of said current is measured. Voltage from the secondary of transformer 31 is supplied to electrodes 20 and 29 through wires 32 and 33 respectively. A current measuring resistor 34 is inserted in lead 32 for a purpose to be described later, and a variable resistance 35 is included in lead 33 whereby the current flowing through core 1 may be adjusted. A voltmeter 36 having a high internal impedance compared to the resistance of the core sample being tested, and preferably having an impedance on the order of one megohm, is provided for measuring the voltage drop across various portions of the circuit. For this purpose terminal 37 of voltmeter 36 is connected to one side of transformer secondary 31 and terminal 38 is connected to one terminal of multicontact switch 39 which is adapted to selectively contact leads 22, 23, 24, 25, and 26 which, as has been pointed out above, are connected to electrode 20 and probe wires 2, 3, 4, and 5, respectively.

In making resistivity saturation measurements according to this invention and using the apparatus described above it is necessary first to secure a core sample of any convenient size from the formation desired to be tested. The core is cleaned, preferably by flowing acetone through the core to remove any hydrocarbons which may be present and then flowing distilled water through the core to remove any salts. Preferably 50 to 100 pore volumes of acetone or some similar material and the same amount of water should be used for this purpose. After thoroughly cleansing the core as outlined above the wires 2, 3, 4, and 5, which may be made of silver, platinum, copper, or any other good conducting material, are twisted tightly about the core at approximately equally spaced intervals along the length thereof.

The core should then be thoroughly dried preferably by baking at approximately 220° F. in an evacuated oven for several hours, after which it is weighed. Thereafter the core may be saturated with any suitable brine by placing it in a chamber, which is then evacuated, and allowing the brine to enter slowly from below.

When the core is completely covered by the brine, atmospheric pressure is admitted and the system allowed to stand for several hours. The saturated core is then placed on a porous disc which is saturated with the same brine and any excess water allowed to drain from the core for a period of about 24 hours in order to insure that the core attains a state of equilibrium.

The core, thus in a state of equilibrium, is then placed in the cell 6 with its bottom face resting on a thin layer 21 of diatomaceous earth or some similar material to insure good capillary contact between this face and ceramic disc 8. Thereafter the cap 9 which carries electrode 20 and terminal board 15 is placed atop cell 6 and tightened thereon, care being taken that contactors 16, 17, 18, and 19 are in good electrical contact with wires 2, 3, 4, and 5, respectively, and that electrode 20 is in good electrical contact with the top face of core 1 through the medium of layer 21 of diatomaceous earth or similar material.

At any convenient time U-tube 27 is partially filled with brine of the same nature and concentration as that with which the core is saturated. Sufficient brine is introduced into U-tube 27 to insure that the brine therein completely fills enlarged portion 28 and completely wets the lower face of ceramic disc 8. Having thus introduced brine into U-tube 27, the height to which such brine rises in the open end of said tube is noted by reference to the graduations on said end.

After the core is thus assembled within the cell 6 and is completely equilibrated at 100% saturation the resistance to flow of electric current through said core is measured. This preferably is done by use of an electrical circuit such as that shown in Figure 2. As will be seen by reference to this figure, one side of the secondary of transformer 31 is connected through lead 32, current measuring resistor 34, and lead 22 to electrode 20, which is in contact with the upper face of core 1, and the other side of said transformer is connected through lead 33 and current adjusting resistor 35 to lead 29 which, as will be seen by reference to Figure 1, is in electrical contact with the lower face of core 1 through the medium of the brine solution contained in U-tube 27, the brine in brine permeable disc 8, and layer 21. The primary of transformer 31 may be connected to any suitable source of alternating current, preferably 60 cycle. The current flowing through core 1 is then preferably adjusted to one milliampere by adjusting variable resistor 35, while observing the voltage drop across current measuring resistor 34 which may be of any suitable known value.

After the current flowing through core 1 has been adjusted to one milliampere, the voltage drops across various increments of the core 1 are measured by moving contactor 39 successively from lead 22 to leads 23, 24, 25, and 26 as schematically represented in Figure 2, and observing the voltmeter reading while contactor 39 is in each position. The voltage drop across each increment of core 1 may then be determined by subtracting from the voltmeter reading at any position the voltmeter reading which was observed at the last preceding position of contactor 39. Thus, knowing the current flowing through core 1 and the voltage drop across various increments thereof, the resistance of each of said increments may be readily calculated by merely applying Ohm's law.

It will be appreciated of course that the resistance which appears between leads 22 and 23 will be the sum of the resistance of that portion of core 1 which is above wire 2 and the interfacial resistance between electrode 20 and the top face of core 1. Since, in spite of all precautions which may be taken to insure good electrical contact between electrode 20 and core 1 there will almost always be a certain amount of resistance at this interface between the brine in the core and the metal of the electrode, it is best not to rely upon the voltage drop appearing between leads 22 and 23 as being truly indicative of the resistance of that increment of core 1 above wire 2. The voltage drops appearing between leads 23 and 24, 24 and 25, and 25 and 26, on the other hand, may be regarded as due solely to the resistance of the three increments of the core between wires 2 and 3, 3 and 4, and 4 and 5 respectively, provided the impedance of the voltmeter is sufficiently high compared to the core that substantially no current flows through the voltmeter leads.

After taking the above mentioned readings, the saturation of core 1 is reduced, preferably by the method known in the art as the capillary pressure method. By this method a source of brine-displacing fluid, preferably nitrogen, is introduced into cell 6 through nipple 12 and passageway 11, and sufficient pressure is applied to said displacing medium as will cause it to displace some or all of the displaceable brine from the core 1. The pressure of the displacing fluid is maintained for a long period, perhaps for several days, in order to insure that the core reaches a state of equilibrium at its reduced saturation. It will be appreciated by those skilled in the art that when pressure of the displacing fluid is applied to the core 1, which is in capillary contact through layer 21 with ceramic disc 8, which disc is permeable to brine but not to the displacing fluid, the brine in the pores of the core will flow, by capillary action, from the core through lower layer 21 and disc 8 into the enlarged end 28 of U-tube 27.

When pressure of the displacing fluid has been maintained upon cell 6 for a sufficient period of time for core 1 to reach a state of equilibrium, the resistance of the several increments of the core 1 is again measured in the same manner as outlined above with respect to the measurements taken while the core was in a state of 100% saturation. In order to insure that the conditions of saturation of the core remain constant while measuring the resistance, the resistance measurements are made while the core is still in place in the cell and under pressure of the displacing fluid.

Simultaneously with making the second resistance measurements outlined above, observation is made of the height to which brine has risen in the open end of U-tube 27. The total amount of brine displaced from core 1 may be calculated by comparing the fluid level at this time with the fluid level therein which was observed before pressure of the displacing medium was applied. The amount of this displaced brine may then be used to calculate the percent saturation of the core at its reduced saturation in a manner well known to those skilled in the art. If desired the pressure of the displacing fluid may again be increased to further decrease the saturation of core 1, the core permitted to reach a state of equilibrium again, and the above data obtained at this further decreased saturation of the core.

Figure 3:
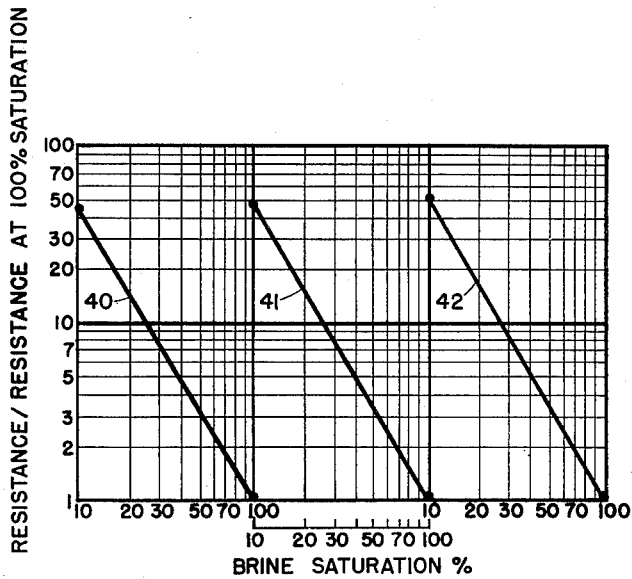
Figure 3 is a set of curves representing typical data which may be obtained by the method of this invention, and from the slope of which the value of the exponent $n$ in the formula $$R_s = R_{100} S^{-n}$$

Having thus determined the resistance to flow of electrical current through increments of the core 1 while said core is in two or more conditions of saturation, curves may be plotted to show the variation of resistance of the various increments with saturation of the core. Figure 3 shows a typical set of such curves plotted on log-log paper in which curves 40, 41, and 42 were obtained by measuring resistance across the portions of core 1 between wires 2 and 3, 3 and 4, and 4 and 5, respectively, in the manner outlined above. The lower point on each curve represents a resistance of unity at 100% saturation of the core, and the upper point on each curve represents the ratio of resistance at reduced saturation to resistance at 100% saturation as an ordinate with the reduced percent saturation of the core as an abscissa. The value of the exponent $n$ is then obtained by averaging the slopes of the curves thus obtained.

Theoretically of course the slopes of the curves should be equal, assuming that the sample is homogeneous; however, as a practical matter, the slopes of the three curves thus obtained will almost inevitably vary due to variations in saturation of the several increments of the core. It will be noted that the percent saturation against which resistance ratio is plotted in the curves of Figure 3 is the average saturation of the entire core, whereas the abscissae are obtained by measurements made across only relatively small increments of said core. Although the saturation of each increment may be more or less than the average saturation of the core, since the average saturation of these increments should be equal to the average saturation of the core, a reasonably accurate value for the exponent $n$ may be obtained by averaging the apparent values therefor as represented by the slope of the curves plotted for each increment.

While the preferred method and apparatus for carrying out this invention have been described above, it is obvious that various minor changes may be made therein without departing from the scope of the invention or claims.

We claim:
1. The method of determining the variation of electrical resistivity of an earth sample with the brine saturation of said sample which comprises washing said sample to remove substantially all impurities therefrom, saturating said sample with a selected brine, and thereafter measuring the resistance to flow of electric current through a plurality of selected increments of said sample intermediate the ends thereof, applying pressure to the sample through the medium of a non-conducting displacing fluid to reduce the brine saturation of said sample to a selected value, and again measuring the resistance to flow of electric current through the same said selected increments of said sample.

2. The method of determining the variation of electrical resistivity of an earth sample with the brine saturation of said sample which comprises treating the sample to remove substantially all impurities therefrom, saturating said sample with a selected brine, and thereafter measuring the resistance to flow of electric current through a plurality of selected increments of said sample intermediate the ends thereof, applying pressure to the sample through the medium of a non-conducting displacing fluid to reduce the brine saturation of said sample to a selected value, and again measuring the resistance to flow of electric current through the same said selected increments of said sample.

3. The method of determining the variation of electrical resistivity of an earth sample with the brine saturation of said sample which comprises saturating said sample with a selected brine, and thereafter measuring the resistance to flow of current through a selected increment of said sample intermediate the ends thereof, applying pressure to the sample through the medium of a non-conducting displacing fluid to reduce the brine saturation of said sample to a selected value, and again measuring the resistance to flow of electric current through said selected increment of said sample.

4. The method of determining the variation of electrical resistivity of an earth sample with the brine saturation of said sample which comprises measuring the resistance to flow of electric current through said sample while said sample is in a state of complete saturation, surrounding said sample with a dielectric displacing medium under selected positive pressure, whereby to reduce brine saturation of said sample to a value less than complete saturation, maintaining the pressure of said displacing medium at said selected pressure for a period of time sufficient for said sample to reach a state of equilibrium at reduced saturation, and thereafter measuring the resistance to flow of electric current through said sample while continuing to maintain said pressure on said displacing fluid.

5. The method of determining the variation of electrical resistivity of an earth sample with the brine saturation of said sample which comprises measuring the resistance to flow of electric current through a plurality of selected increments of said sample while said sample is in a state of complete saturation, reducing the brine saturation of said sample to a given value by subjecting said sample to an atmosphere of a dielectric displacing medium maintained at a selected positive pressure, whereby a portion of the saturating brine is driven from said sample, maintaining said pressure on said displacing medium for a period of time sufficient for said sample to reach a state of equilibrium at reduced saturation, and thereafter again measuring the resistance to flow of electric current through said selected increments of said sample while continuing to maintain said pressure on said displacing medium.

6. The method of determining the variation of electrical resistivity of an earth sample with the brine saturation of said sample which comprises completely saturating said sample with a selected brine solution, applying an alternating current voltage across said sample whereby an electric current is caused to flow through said sample, measuring the voltage drop across selected increments of said sample intermediate the ends thereof, placing said sample in an atmosphere of dielectric medium, applying a positive pressure to said medium whereby said medium displaces a portion of the saturating brine from said sample, maintaining said positive pressure on said dielectric medium for a period of time sufficient for the displacement of brine by the dielectric medium to reach a state of equilibrium, and thereafter again measuring the voltage drop across said selected increments of said sample while continuing to maintain said positive pressure upon said dielectric medium.

7. The method of determining the variation of electrical resistivity of an earth sample with the brine saturation of said sample which comprises completely saturating said sample with a selected brine solution, applying an alternating current voltage across said sample whereby an electric current is caused to flow through said sample, measuring the voltage drop across selected increments of said sample intermediate the ends thereof, reducing the brine saturation of said sample to a selected value by subjecting said sample to an atmosphere of a dielectric displacing medium maintained at a selected positive pressure, whereby a portion of the saturating brine is driven from said sample, maintaining said selected positive pressure upon said displacing medium for a period of time sufficient for said sample to reach a state of equilibrium at reduced saturation, and again applying said voltage across said sample and measuring the voltage drop across said selected increments of said sample while continuing to maintain said selected pressure upon said displacing medium.

HARRELL L. BILHARTZ.
HENRY F. DUNLAP.

REFERENCES CITED

The following references are of record in the file of this patent:

UNITED STATES PATENTS

| Number | Name | Date |
|---|---|---|
| 2,225,248 | Lewis et al. | Dec. 17, 1940 |
| 2,437,935 | Brunner et al. | Mar. 16, 1948 |
| 2,539,355 | Reichertz | Jan. 23, 1951 |